Aug. 8, 1967 W. B. MARSHALL ET AL 3,335,035

METHOD OF GROWING CRYSTALS HAVING A TRIANGULAR CROSS SECTION

Filed March 26, 1964 2 Sheets-Sheet 1

INVENTORS
WILLIAM B. MARSHALL, DECEASED
BY CAROL E. MARSHALL, ADMINISTRATRIX
HOWARD W. NORMAN
BY Mueller & Aichele
ATT'YS.

METHOD OF GROWING CRYSTALS HAVING A TRIANGULAR CROSS SECTION

Filed March 26, 1964 2 Sheets-Sheet 2

INVENTORS
WILLIAM B. MARSHALL, DECEASED
BY CAROL E. MARSHALL, ADMINISTRATRIX
HOWARD W. NORMAN
BY Mueller & Aichele
ATT'YS.

United States Patent Office 3,335,035

Patented Aug. 8, 1967

3,335,035
METHOD OF GROWING CRYSTALS HAVING A TRIANGULAR CROSS SECTION

William B. Marshall, deceased, late of Tempe, Ariz., by Carol E. Marshall, administratrix, Burlington, Mass., and Howard W. Norman, Scottsdale, Ariz.; said Norman assignor to Motorola Inc., Franklin Park, Ill., a corporation of Illinois Filed Mar. 26, 1964, Ser. No. 356,007
4 Claims. (Cl. 148—1.6)

This invention relates to a method and apparatus for growing monocrystalline germanium crystals, to the crystals grown by the same, and to the dice or crystal elements produced from crystal wafers cut or otherwise obtained from a grown-crystal.

So-called large area junctions in alloy-junction semiconductor devices present problems from cost and quality standpoints which start at the crystal growing stage and continue on through the cutting of dice and alloying of contacts thereon, right through to the complete fabrication of the semiconductor device and its operation. Many of these problems were solved by the Taylor invention of Patent No. 2,971,869 which issued Feb. 14, 1961, disclosing the fabrication of an alloy-junction semiconductor structure, and the structure itself, in which the semiconductor die or crystal element has a face or surface substantially parallel to any one of the structurally equivalent planes of the {111} group of Miller indices within the crystal element, and has an electrode alloyed to that face. Alloy junctions within such a crystal element contribute significantly to the uniformity of semiconductor structures made according to the invention of such patent, and to the excellency of operation of such structures. However, factors in the crystal itself, such as uniformity of resistivity in the grown crystal which in turn provides a uniformity in the many dice or crystal elements produced out of a grown-crystal, the lifetime of the elements, and other characteristics material to operation of semiconductor devices, called for improvement. Additionally, the yield of dice, or the number which could be obtained from a grown germanium crystal has been a very significant cost factor in the manufacture of alloy-junction devices. This made for an ever-present problem starting with crystal growing, and at this stage, the necessity for providing apparatus which would grow a crystal with top quality in each significant characteristic. Improvements made in initially growing a germanium crystal are actually reflected in the final cost of the structures or devices using the crystal material, and in the operation thereof in all of the many known applications for germanium alloy-junction devices.

An object of the present invention is to provide an apparatus and method for growing semiconductor crystals which is simple, and reliable, and produces a grown-crystal from which a greater number of dice or crystal elements per each grown crystal can be obtained than in the prior art, and with the same or improved operating characteristics in each element.

A feature of the present invention relative to the prior art is the provision of a horizontally disposed crystal-growing apparatus which includes an open boat or crucible that is triangular-shaped in cross-section to produce a corresponding cross-section in the grown-crystal, with the apex for the triangular cross-section at the bottom. During operation of the apparatus, the boat rests in a predetermined atmosphere in an enclosure, and a heater for the boat moves over the length thereof while the enclosure and boat remain stationary.

It has been the practice in the prior art with horizontally-placed receptacles in which semiconductor material is melted, to cover the inside walls of the receptacle with soot before placing crystal material therein. When the soot covering is not put on so as to fully cover the melting area, or is scratched or disturbed either during the loading of the receptacle or during the crystal growing operation, serious damage can occur to the crystal being grown and a polycrystalline growth may result from the contact between the germanium and the quartz of the receptacle wall. It is a feature of this invention to provide a single piece of graphite cloth cut to a size to lay loosely over the inside wall of the receptacle to prevent any contact between the melted crystal material and receptacle wall so that a monocrystalline growth is accomplished. There is enough "give and take" in the cloth that it takes up expansion or contraction of the crystal during the entire growing operation.

A further feature of the invention is the production or the growing of a crystal having a triangular cross-section corresponding to the boat or receptacle in which it is grown, and such cross-section provides a greater number of dice or crystal elements of a predetermined size from each crystal wafer sliced or removed from the grown-crystal than has been obtained from wafers cut across any known prior grown semiconductor crystal of a corresponding bulk.

It is also a feature of this invention that the triangular cross-section of the crystal provides not only more dice or crystal elements for the same total bulk in the grown crystal relative to the grown semiconductor crystals in the prior art, but there is improvement in those characteristics of the semiconductor crystal elements which are important to the operation of the final semiconductor devices in which the elements are used.

Yet another feature of this invention is the orientation of the seed crystal so that as a single crystal of triangular cross-section is grown, crystal growth progresses from certain preferred planes identified by the Miller indices $(\bar{1}\bar{1}\bar{1})$, $(\bar{1}11)$, $(1\bar{1}1)$ and $(11\bar{1})$ as specially defined within this specification since it is easier to grow a single crystal from one of these planes, and moreover the crystal will be of a significantly high quality.

Figures 1, 2, 6, 7:
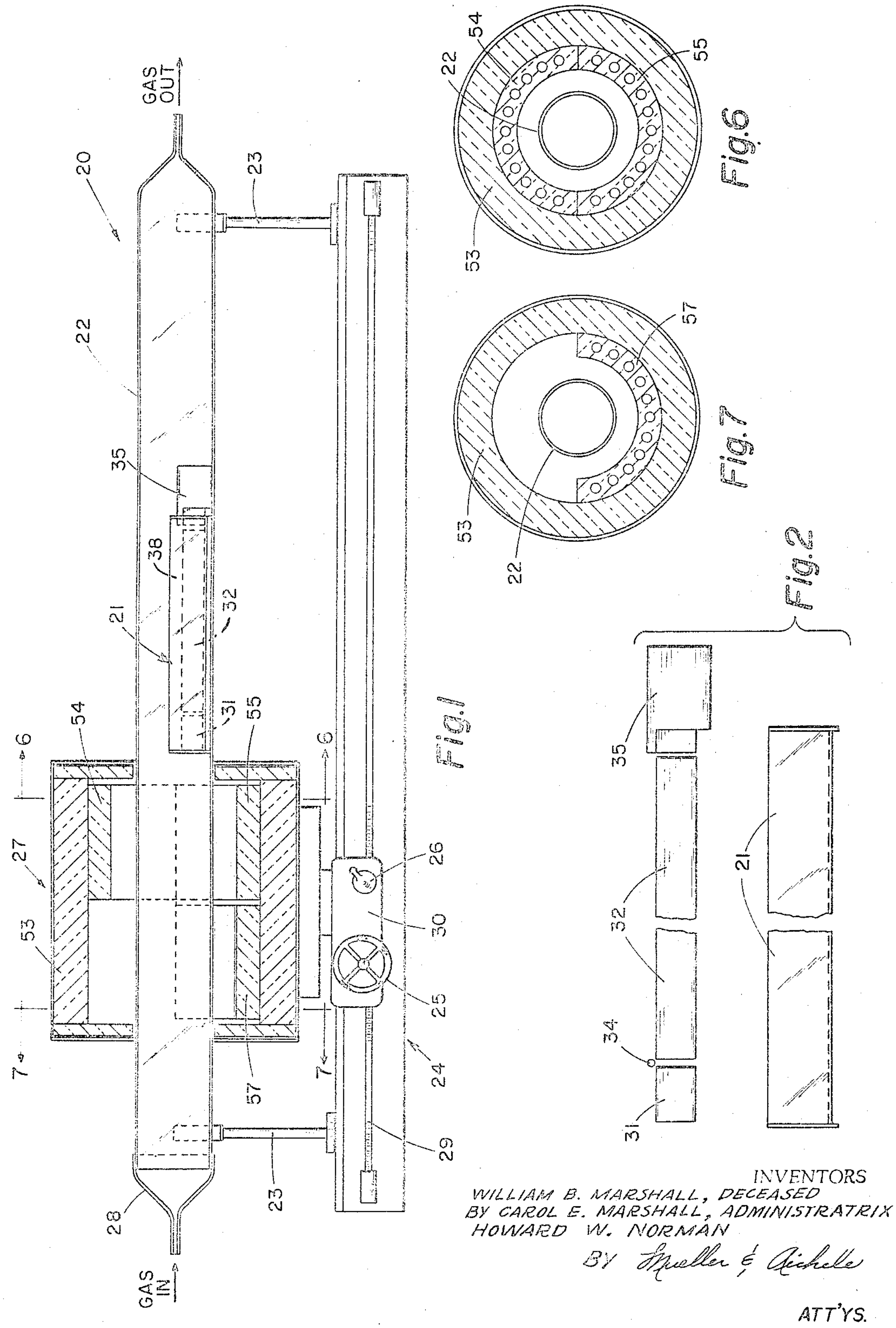
FIG. 1 is a schematic-type showing of the complete apparatus of the present invention for growing a monocrystalline germanium crystal. A portion of the apparatus is shown in cross-section, and there are portions in dotted lines within the gas-filled enclosure in which the germanium is heated.
FIG. 2 is a developed illustration with a quartz boat or receptacle in a side elevation, and with the crystal material ready to be loaded in the boat for melting and for growing of a crystal.
FIG. 6 is a view along line 6—6 of FIG. 1, showing heating elements and the heater in cross-section.
FIG. 7 is a corresponding cross-sectional view along the line 7—7 of FIG. 1.

The illustration of FIG. 1 is more general than that of some of the other figures for different portions of the complete crystal growing apparatus 20, and will be described in a general way, after which a detailed description will be made of those parts shown in detail in succeeding figures.

The quartz boat or receptacle 21 is positioned within a transparent hollow oven or chamber 22 in one commercial embodiment of the invention, and the oven is mounted stationary on supports 23 at each end. These supports in turn are mounted on the bed 24 of a lathe which includes a screw-driven carriage 30 upon which a furnace 27 is mounted. The screw 29 is motor-driven at a predetermined speed, and the carriage 30 is advanced longitudinally of the complete apparatus, as illustrated.

Figures 3, 4, 5, 8, 9, 10:
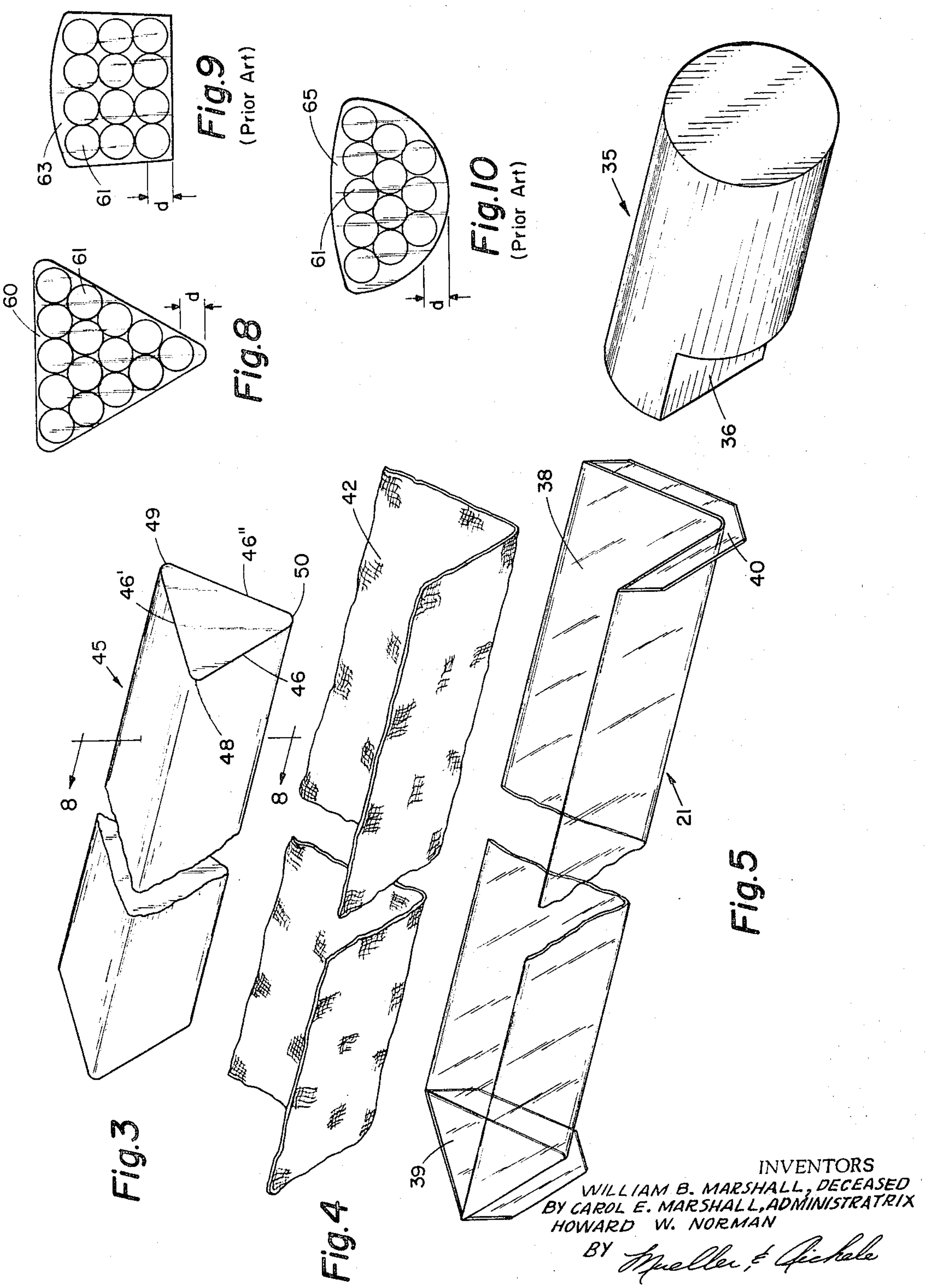
Fig.3 Fig.4 Fig.5 Fig.8 Fig.9 (Prior Art) Fig.10 (Prior Art)
FIG. 3 is a perspective view with a center portion broken away of the complete triangular cross-section grown-crystal.
FIG. 4 illustrates the piece of graphite cloth which is dropped into the quartz boat or receptacle of FIG. 5 to take the general configuration here shown when supported on the inside wall of the boat.
FIG. 5 is a quartz boat in perspective with the center portion broken away, and showing also a graphite plug (shown also in FIGS. 1 and 2) which is inserted in the open end of the boat when the germanium material is loaded therein for a crystal-growing operation. The graphite plug is independent of the boat itself.
FIG. 8 is a cross-section through the line 8—8 of FIG. 3, and corresponding to the full size of commercially grown germanium crystal according to the present invention, with the circles illustrating the position of dice or individual crystal elements to be made from a crystal wafer which in turn is cut out of or sliced at right angles across the crystal of FIG. 3.
FIG. 9 illustrates the cross-section of one configuration for germanium monocrystalline crystals grown according to prior art methods and apparatus, and illustrating the arrangement of round dice in a wafer of that cross-section. It shows directly the fewer number of elements which can be cut from a wafer of such a cross-sectional configuration.
FIG. 10 is another cross-sectional view illustrating the maximum number of round crystal elements which can be obtained from another wafer configuration cut or sliced from a crystal of corresponding cross-sectional configuration.

The crystal growing procedure begins with the loading of the quartz boat 21 in preparation for the charging of the crystal growing apparatus. In FIG. 2 is shown, in an exploded view, the crystal growing charge, which will be placed within the chamber 22 of the apparatus 20 prior to the crystal growing step. In making up the charge in the quartz boat 21, the boat is lined with graphite cloth which is not visible in this view (but as shown in FIG. 4), and a germanium speed crystal 31 and an ingot 32 of nearly intrinsic zone refined monocrystalline germanium are placed on the liner in the boat. A small piece of strongly N or P type germanium 34 which is the source of impurity used to dope the crystal is likewise included in the charge, and a graphite plug 35 is provided to close the open end of the boat. The quartz boat 21, graphite cloth liner 42 and graphite plug 35 are a part of the crystal growing apparatus 20.

The quartz boat 21 is shown more clearly in FIG. 5. It consists of a V-shaped trough 38 having an included angle between the sides of 60°. Supporting members 39 and 40 of quartz are provided at each end of the trough 38 so that the boat 21 may be positioned properly in the chamber 22, with supporting member 39 closing one end of the trough, while the other end of the trough is closed by the graphite plug or block of graphite 35.

The graphite plug 35 has three functions during the crystal growing procedure; it closes the end of the quartz boat 21 and thereby prevents molten germanium from flowing out of the boat, it serves as an expansion joint so that any increase in the overall length of the charge of germanium during crystal growth is accommodated without subjecting the germanium to appreciable strain, and finally, it acts thermally as a continuation of the germanium so that the heating and cooling characteristics of the germanium ingot will be substantially the same from one end to the other thereby insuring a more uniform final crystal. The graphite plug 35 is formed by machining one end of a round piece of nearly pure graphite (1 part impurity allowed in $10^5$ parts graphite) so that it has a V-shaped portion 36 which accurately fits the open end of the quartz boat 21 when the graphite cloth liner is in place.

The seed crystal 31 and the ingot 32 are each triangular in cross-section. Each of the vertices of the triangular cross-section is approximately a 60° angle. Both the seed and the ingot have the same general shape as that of a finished germanium crystal 45, an example of which is shown in FIG. 3, In order that the finished crystal 45 may be cut perpendicularly to its length to form equilaterally triangular wafers whose major surfaces lie in one of the {111} planes, the seed crystal 31 used to start it growing in an acceptable orientation must be placed in the boat 21 adjacent the ingot 32 so that one of these planes is perpendicular to the sides of the boat 21. Miller indices when shown enclosed by braces as in the preceding sentence, identify planes within a group which are equivalent though their specific indices may differ. For example, the group {111} includes the sets of equivalent planes with Miller indices (111), $(\bar{1}11)$, $(1\bar{1}1)$, $(11\bar{1})$, $(\bar{1}\bar{1}\bar{1})$, $(1\bar{1}\bar{1})$, $(\bar{1}1\bar{1})$, and $(\bar{1}\bar{1}1)$.

In addition, to grow the best triangular crystals in this general {111} orientation with the least trouble, it is necessary that crystal growth occur in special or preferred orientations relative to the boat 21 as well as to the crystal and this requires extra attention to the placement of the seed crystal 31 in the boat. In order to discuss crystal growth relative to the boat 21 in a meaningful manner and subsequently to describe the preferred orientations of the seed crystal 31 relative to the boat, it is first necessary to define a set of references which uniquely relates the structure of the crystal to the shape of the quartz boat. This is most conveniently accomplished by choosing a set of parallel planes in the germanium crystal structure from the eight equivalent sets of planes with orientations according to the {111} group of Miller indices and then further defining that set of planes as being (111) planes or having the (111) orientation for just that position of the seed crystal relative to the boat so that when crystal growth from the seed occurs in an acceptable general orientation, i.e., so major surfaces of equilaterally triangular wafers cut from the crystal lie in one of the {111} planes, the part of the crystal where facets would ordinarily form will be on top of the crystal 46 and two sides 46′ and 46″ of the crystal that face against the two sides of the trough of the quartz boat 21. Facets, in this case, are flat faces which are found on single crystals as a result of crystal formation rather than by cutting or shaping, or regions that would be flat faces had they not been constrained in some manner. When the position of the seed in the boat gives rise to crystal growth as described, the seed orientation relative to the boat (and of course the orientation of crystal grown from the seed) will be defined as being the (111) orientation. With the (111) orientation specially defined as above, it can be shown that the orientation of all other crystal planes relative to the boat are now uniquely determined, so one may now discuss directly the rotation of the seed into preferred or other orientations relative to the boat by the use of just the Miller indices alone. For example, if the seed crystal has a (111) orientation in the boat (as the (111) orientation has been defined with respect to the boat), the $(\bar{1}\bar{1}\bar{1})$ orientation is that which is achieved by simply turning the seed around so that the ends are reversed in the boat. Further rotation of the crystal from the $(\bar{1}\bar{1}\bar{1})$ orientation but about either the *x*, *y* or *z* crystallographic axis will produce the $(\bar{1}\bar{1}1)$, $(1\bar{1}1)$ or $(11\bar{1})$ orientations respectively.

There are four preferred {111} orientations relative to the boat, and it has been determined that for crystals grown in these orientations the quality is better and the incidence of twinning and the formation of polycrystalline crystals is less by more than 90% as compared to crystals grown on the other four orientations of the {111} group. The four preferred orientations are the $(\bar{1}\bar{1}\bar{1})$, $(\bar{1}11)$, $(1\bar{1}1)$ and the $(11\bar{1})$, and they differ from the (111) orientation as further defined in relation to the boat, in that crystal growth in one of these four orientations results in facets at the corner regions 48, 49 and 50 of the crystals 45 (FIG. 3). While there is, of course, no difference in the true crystal planes of the {111} group, the orientations $(\bar{1}11)$, $(1\bar{1}1)$, $(1\bar{1}1)$ and $(\bar{1}\bar{1}\bar{1})$ as defined in relation to the boat are referred to as preferred orientations due to the fact that crystals grown in these orientations are superior and that there is a reduction in twinning and polycrystallization for crystal growth in these orientations. Twinning (i.e., the growth in a different orientation of a new crystal away from some plane of the crystal that was originally growing so that two different crystals exist on either side of the plane) as well as the formation of polycrystalline material readily originates at facets. Since there is much less area at the corners 48, 49 and 50 of the crystal 45 than on the sides 46, 46′ and 46″ of the crystal, it appears that the observed reduction in twinning in the commercial practice of the present invention, and the formation of polycrystalline material for growth from one of these four planes, may be explained by the probability that twinning and polycrystallization is less where the surface at which faceting occurs is small simply because there are fewer places at a smaller surface for twinning and polycrystallization to begin.

The graphite cloth liner 42 of FIG. 4 for the quartz boat 21 is a very flexible material and, when properly placed, it will rest smoothly against the sides of the quartz boat 21 in order that ingot 32 and seed 31 closely fit the V-shaped trough 38.

The use of a graphite cloth boat liner 42 is especially important to the crystal growing procedure for several reasons. As is known, during the cooling and recrystallization of the germanium, if the germanium comes in contact with the quartz, the contact often results in the formation of twinned or polycrystalline germanium. In the past, quartz boats have been coated with carbon by smoking them in a flame such as the candle flame and by other methods, to provide a carbon or soot film in order to prevent contact between the quartz and the germanium. The soot film also prevents sticking of the germanium to the quartz. A soot film, however, is fragile and easily destroyed by the hard surface of the germanium, and unless considerable care is exercised during the loading of the quartz boat, the surfaces of the germanium will scratch away parts of the film and expose the regions of the underlying quartz. Even when these regions are extremely small they can still cause polycrystallization and twinning. However, when graphite cloth is used as a boat liner 42, the germanium may be loaded into the boat 21 without any particular care, for the graphite cloth liner 42 is strong and is not damaged by loading procedures which would have ruined a soot film.

While the graphite cloth 42 does not provide a continuous or completely closed surface against the germanium, it is a fairly close weave, and since graphite is not wet by germanium the molten germanium does not flow through it and come in contact with the quartz.

The graphite cloth, of the particular type being used for this purpose, is fairly thick and is considerably freer of those impurities which degrade semiconductor material than is quartz. Furthermore, the cloth 42 has body and does not fit tightly against the side walls of the boat 21 as was the case for the soot film, and these conditions separate the germanium from the quartz in a way such that a reduction in amount of contamination of the germanium by impurity materials diffusing from the quartz, has been observed and contaminants in by the soot layer itself are not found in the graphite cloth.

Graphite cloth may be obtained from manufacturers having a total impurity content of less than ten parts per million. This is about the purity of the best spectrographic grade of solid graphite. Graphite cloth is relatively inexpensive so that each piece used may be discarded after each crystal has been grown. It is also rather absorbent, and discarding it after a single use is desirable so that the purity of successively grown germanium crystals is further assured.

The use of the graphite cloth results in a reduction in the dislocation density of the germanium crystal and an attendant improvement in lifetime. Germanium, like silicon, bismuth, and similar materials, expands when it solidifies and if the germanium crystal is confined, the expansion will set up considerable strain in it, resulting in a high dislocation density and low lifetime. The graphite cloth boat liner 42, being resilient, gives during the expansion of the freezing germanium so that there is much less strain in the germanium, and the final grown crystal is thereby improved.

The use of the graphite cloth as a liner also has some thermal advantage during the crystal growing process. Being of a somewhat open texture as has any cloth, the liner has a moderate insulating quality and so it impedes the heat flow into the quartz boat and to some extent reduces the amount of heat conducted away from the crystal by the quartz. This causes the liquid crystal interface to be more nearly vertical during recrystallization which results in a crystal lattice which has fewer imperfections.

The graphite cloth which is used in the commercial embodiment has a weave of the type that the textile industry refers to as a "plain" weave. This is a weave such as would be found in an ordinary piece of cotton cloth. The graphite cloth contains no binder and has the following specifications:

| | |
|---|---|
| Impurity content total weight, parts/million or less | 10 |
| Weight, oz./sq. yd. | 7.3 |
| Gauge, in. | 0.023 |
| Tensile strength of warp, lbs./in. | 25 |
| Tensile strength of fill, lbs./in. | 23 |
| Electrical resistance at 70° F., ohm/sq. cm. | 0.5 |
| Strands per thread (braided together to form thread) | 3 |
| Filaments per strand | 500 |
| Filaments diameter, in. | 0.0005 |

It has been found that carbon felt, and graphite felt may also be employed in the same manner as has the graphite cloth. These materials are not as yet available in quite as pure a form as the graphite cloth, however, and therefore, are not as desirable for use as boat lining for growing germanium crystals.

The melting and heating of the germanium material is accomplished by the furnace 27 (FIG. 1) which consists of a heater and an afterheater within a cylindrical insulated jacket 53. The heater is comprised of two half-cylindrical heating elements 54 and 55 which are brought together to form the cylindrical section shown in FIG. 6 surrounding the chamber 22. The afterheater consists of a single half-cylindrical heating element 57, and as shown in FIG. 7 is located in the furnace jacket 53 beneath the chamber 22 so that heat is directed upward toward the lower portion of the trough 38. This is necessary so that as the crystal forms, the fall in temperature due to loss of heat from the germanium at the sides near the bottom will be retarded. If heat is not directed upward toward the lower sides of the trough, the liquid zone present during the crystal formation tends to be wider at the top than at the bottom giving rise to a crystal-liquid interface which may angle considerably with respect to the orientation of the desired crystallographic plane. This is undesirable since it results in a resistivity which is typically very much lower at the bottom of the crystal than elsewhere. However, with the afterheater heating element 57 properly adjusted, the liquid zone width is approximately the same at the top as at the bottom.

Returning again to the procedure: when the crystal growing boat 21 has been loaded, the apparatus 20 is charged by removing the end cap 28 from the chamber 22 and placing the loaded boat 21 in the chamber in the position shown in FIG. 1. In order that the finished crystal has an equilaterally triangular cross-section, it is necessary that the 60° included angle of the trough of the boat be so positioned that a vertical plane through the vertex of the trough will bisect that angle. The end cap 28 is then replaced and nitrogen is permitted to flow through the chamber 22 for a period of time sufficient to purge the chamber of any oxygen or water vapor which might react with the heated germanium during the crystal growing process. After sufficient purging of the chamber, the furnace 27 is moved to a particular location relative to the seed and ingot in the boat 21 by rotating the handwheel 25 of the lathe carriage 30. In this position the hottest zone is approximately centered relative to the seed and ingot junction point, as shown in their original condition and position in FIG. 2. The furnace 27 is left in this position until some of the material on either side of this seed and ingot junction point and the germanium containing the dopant are melted together, and have reached equilibrium at which no further melting occurs. Then the mechanism which rotates the lead screw 29 is activated, and the half nut 26 on the lathe carriage 30 is engaged to feed the furnace very slowly down the length of the chamber 22. As the furnace 27 travels along relative to the germanium charge in the boat 21, the molten germanium cools slowly and monocrystalline germanium forms in the orientation dictated by the seed. The germanium is doped as required by the impurity introduced in the loading procedure. Most of the impurity travels along in the molten region, and the amount which remains behind in the crystal is determined primarily by the distribution coefficient of the impurity.

After the furnace 27 has passed over the germanium and the germanium has cooled sufficiently, the boat 21, plug 35, and the germanium crystal are removed from the chamber 22 and the boat 21 is unloaded and the seed cut from the crystal. The completed single crystal of germanium 45 is shown in FIG. 3. It has substantially the same equilaterally triangular cross-sectional size and shape that the ingot had initially. A cut across this triangular bar of single crystal germanium perpendicular to the three sides will produce a wafer as 60 (FIG. 8), with major faces parallel to one of the {111} group of crystallographic planes. As previously mentioned, substantial improvement is found in the quality of germanium crystal so grown when the seed crystal 31 is oriented so that crystal growth commences in a manner so that faceting occurs at the corners of the triangular crystal rather than on the sides. The occurrence of twin crystals is substantially less, and so is the dislocation count in the crystal.

The crystal of equilaterally triangular section as thus grown is particularly desirable when cut into wafers 60, and each wafer is subsequently cut into round semiconductor dice 61. The number of the circular die 61, per unit area, cut from a wafer 60 is at a maximum with the lateral triangle shape for the cross-section, and hence the waste from a complete grown crystal of the present configuration is at a minimum. It is a simple thing to adjust the size of the triangular section in the present invention to give the maximum utilization of semiconductor material for a given dice size, since all that needs to be done is to increase or decrease the size of the cross-section of the triangular ingot 32 used in growing the crystal 45. This may be done by placing more or less raw germanium material into the zone refining mold in which the polycrystalline ingot 32 will be cast during the zone refining process to prepare the germanium for subsequent crystal growing.

The two more commonly used crystal growing boats used in prior zone leveling apparatus have structures which are trapezoidal and semicircular in form, and when these crystals are cut or sliced into wafers, they provide respectively, germanium wafers 63 and 65 of the shapes shown in FIG. 9 and FIG. 10. Comparing the three wafer shapes 60, 63 and 65 which are equal in area, FIG. 9 shows that the dice 61 in that cross-section are packed in the densest way possible, but there is still considerably more waste in the interstitial regions than there is in the interstitial regions of FIG. 8, or in the semicircular section of FIG. 10. The packing density of dice is fairly good in FIG. 10, but there is considerable waste along the edges of the wafer 65, and in large production of semiconductor devices, and correspondingly large requirements for dice, this saving in waste is important. While fifteen dice of the size shown may be cut from the triangular wafer of a predetermined area, only twelve dice may be cut from either of the other two wafers of the same total area. A circular wafer (not shown), as cut from a grown germanium crystal of such cross-section must have an area slightly larger than the area of the triangle in order to provide the same number of dice of the size illustrated in FIGS. 8 to 10.

It is well-known that when semiconductor crystals are grown by the zone leveling process which is the type of process described here, the resistivity of the region very near the bottom of the crystal will usually be found to be much lower than elsewhere. Customarily this portion of the material is scrapped as it is usually too far out of manufacturing specification to be useable in the ultimate semiconductor device for which it had been intended. In FIGS. 9 and 10, note that this scrap region *d* represents a large percentage of the total crystal. In FIG. 9 four dice, or 33.3%, fall in the low resistivity region and cannot be used, and in FIG. 10 approximately 25% of the die cannot be used for the same reason. However, in FIG. 7, only one, or 6.6% of the whole, is wasted.

Comparing the total utilization of material for the triangular shape versus the other three shapes (trapezoidal, semicircular and circular), the triangular wafer will provide 75% more dice than the trapezoidal wafer, 55% more dice than the semicircular wafer, and 17% more dice than the circular wafer.

In one embodiment of this invention, the circular germanium die 61 as produced is used in the fabrication of power transistors presently being manufactured at the rate of more than a million per year. The dice used in their preparation are 260 mils in diameter, are of N type germanium having a lifetime of 50 microseconds, a dislocation density less than 8000 per square centimeter and a resistivity in the range of 9 to 14 ohm-centimeter. This germanium material is grown in a quartz boat 21 having a length of approximately 18 inches and a depth of about 1½ inches from a seed crystal 31 which is free of lineage and has a dislocation density less than 2000 per square centimeter. A triangular 40 ohm-centimeter N type ingot 32 of germanium is placed in the quartz boat 21 on the graphite cloth 42 so that it butts against the seed crystal 31. The ingot 32 has substantially the same size cross-section as the seed. The small portion of germanium material 34 containing the N type doping agent antimony, which is placed at the seed-ingot junction point on top of the seed and the ingot, is about 12 grams in weight and has an antimony impurity concentration such that the resistivity is .005 ohm-centimeter. The graphite plug 35 which closes the end of the boat at the cylindrical portion has a diameter of about 2 inches and the triangular section 36 which fits in the boat is approximately the same size in cross-section as the ingot. In the particular apparatus used in preparing germanium for these transistors the chamber is of clear quartz about 75 millimeters inside diameter and is about 58 inches long.

After the chamber 22 of the apparatus 20 has been charged and the end cap 28 replaced, the chamber is purged of air by flowing nitrogen through it. After purging, nitrogen plus 5% hydrogen gas is passed through the chamber at a flow rate of about 4.5 liters per minute. Initial heating of the seed-ingot junction region is for 2 hours at 980° C. The hot zone is adjusted so that melting occurs for about 1 inch on either side of this region. After equilibrium has been reached, the crystal growing is completed by allowing the furnace to travel over the germanium at a rate of about 1 inch per hour.

During the period of time that the furnace 27 travels over the germanium and the crystal is growing, that part of the germanium which lies beneath the hottest part of the furnace will be molten for a region about 2½ inches in length except, of course, when the furnace is over the end of the ingot.

After the crystal 45 was formed and the furnace 27 has passed completely over the germanium, the motion of the furnace is stopped and the crystal is cooled in the hydrogen atmosphere of the chamber. After the crystal 45 is cool, the boat 21 is removed from the furnace and the crystal removed from it. The old seed crystal 31 is then cut from the new crystal 45 and the new crystal is classified according to resistivity, lifetime and dislocation density using well-known testing procedures.

A conservative example of the characteristics for germanium crystals made in accordance with this invention is shown below for triangular 20 ohm-centimeter resistivity crystals having a cross-sectional area of 1.25 square inches, and these characteristics exist over 75% of the length of each crystal:

| | |
|---|---|
| Typical resistivity range cross-section (neglecting bottom-inch of crystal) | ±5% |
| Lifetime (microseconds) | 1500 |
| Dislocation density, (number/square centimeter) | 500 |

We claim:

1. A method of growing a germanium single crystal in the form of a three cornered elongated bar having a substantially equilateral triangular cross-section, said method comprising the steps of lining a V-shaped trough in a quartz boat with a piece of graphite cloth, placing an ingot of germanium in the trough and separated therefrom by the cloth, placing in said trough adjacent one end of the ingot and within the cloth a bar of germanium seed-crystal having cross-section normal to the major axis thereof and which is substantially parallel to one set of the crystal planes described by the {111} group of Miller indices, and with said seed oriented relative to said ingot and said quartz boat so that when crystal growth occurs in the germanium it will proceed along the length of said boat and perpendicularly from one of the planes in the seed crystal in the orientation selected from the group having the Miller indices $(\bar{1}11)$, $(1\bar{1}1)$, $(11\bar{1})$ and $(\bar{1}\bar{1}\bar{1})$, where said Miller indices are additionally defined relative to the placement of said seed in said boat so that crystals grown from said seed in the orientation (111), (111), (111) and (111) have facets at each corner, placing said quartz boat after it is loaded in a furnace so that the boat sits in a horizontal position therein, and melting, and then cooling said seed and said ingot to grow said germanium single crystal.

2. Single crystal semiconductor fabrication, including in combination:
   - selecting an elongated quartz boat opening upwardly and having a cross-section with an angle formed between the side walls of substantially 60° and with first and second ends open,
   - placing a woven cloth consisting of graphite fibers in said boat for lining said boat in an area where semiconductor material is to be processed,
   - closing said first end with axially movable heat radiating graphite means,
   - closing said second end with means having a semiconductor seed crystal and orienting such crystal according to the Miller indices $(11\bar{1})$, $(1\bar{1}1)$, $(11\bar{1})$, and $(\bar{1}\bar{1}\bar{1})$ so that the planes $(\bar{1}11)$, $(1\bar{1}1)$, $(11\bar{1})$ enter inwardly of the boat length with two crystal plane edges of said seed lying along said cloth,
   - placing a bar of semiconductor material to be treated and shaped to fit into said boat on said cloth and adjusting said graphite means such that said crystal and graphite means butt ends of said bar, and
   - heat treating said material for altering its structure to be that of said seed crystal with said heat treatment starting at said seed crystal and proceeding toward said graphite means with only a portion of said material being molten at a given time and forming growth lines along the corners of the germanium as it solidifies.

3. A method of processing crystal type materials, including the steps for forming an elongated bar of such material having selected characteristics:
   - selecting an elongated boat having low thermal conductivity with its opposing ends open,
   - lining said boat with a resilient woven cloth,
   - placing material to be processed on said cloth,
   - providing a radiating thermal path at one end of such material having a thermal conductivity substantially greater than said boat,
   - closing the boat ends, and
   - selectively heat treating a portion of said material proceeding toward said thermal path and said path serving as a heat sink for controlling the volume of such portion of material such that the crystal material continuously solidifies substantially along a plane perpendicular to length of said bar as the processing is moved toward said path.

4. A method for reliably starting the growth of single crystal germanium semiconductor material in the form of an elongated bar having a substantially equilateral triangular cross-section:
   - said method including the steps of placing an ingot of said germanium semiconductor material in a V-shaped trough, placing in said trough and said contacting ingot a seed crystal having an orientation relative to said ingot and said trough such that one crystal plane is perpendicular to the sides of said trough and said one plane being according to one of the Miller indices $(\bar{1}11)$, $(1\bar{1}1)$, $(11\bar{1})$ and $(\bar{1}\bar{1}\bar{1})$ so that the planes $(\bar{1}11)$, $(1\bar{1}1)$, $(11\bar{1})$ enter inwardly of the boat length with two edges of said one crystal plane of said seed lying parallel to the sides of said boat, and
   - initiating crystal growth such that the growth lines are formed at the corners of said bar.

References Cited

UNITED STATES PATENTS

| | | | |
|---|---|---|---|
| 2,773,923 | 11/1956 | Smith | 23—273 |
| 2,825,549 | 4/1958 | Florio | 23—273 |
| 2,960,326 | 11/1960 | Blok | 148—1.6 |
| 3,034,871 | 5/1962 | Stewart | 148—1.6 |
| 3,036,898 | 5/1962 | Brock et al. | 148—1.6 |
| 3,041,690 | 7/1962 | Mytton et al. | 252—62.3 |
| 3,172,791 | 3/1965 | Allegretti et al. | 252—52.3 |
| 3,247,576 | 4/1966 | Dill et al. | 148—1.6 |

OTHER REFERENCES

Paar: Zone Refining and Allied Techniques, George Newnes Limited, London, Published 1960, relied on page 33. Other pages applicable include 31, 32, 34–40.

Richards: Article in Journal of Applied Physics, vol. 31, No. 3, March 1960, pp. 600–603.

DAVID L. RECK, *Primary Examiner.*

HYLAND BIZOT, *Examiner.*

N. F. MARKVA, *Assistant Examiner.*